(12) United States Patent
Wee et al.

(10) Patent No.: US 11,545,890 B2
(45) Date of Patent: Jan. 3, 2023

(54) DEVICE AND METHOD FOR PROVIDING AN ELECTRICAL CURRENT TO AN ELECTRICAL LOAD VIA A PLURALITY OF IDEAL VOLTAGE WAVEFORMS

(71) Applicant: OPULENT ELECTRONICS INTERNATIONAL PTE. LTD., Singapore (SG)

(72) Inventors: Kai Fook Francis Wee, Singapore (SG); Andrea Stona, Singapore (SG); Hai Boon Tan, Singapore (SG)

(73) Assignee: OPULENT ELECTRONICS INTERNATIONAL PTE. LTD., Singapore (SG)

( * ) Notice: Subject to any disclaimer, the term of this patent is extended or adjusted under 35 U.S.C. 154(b) by 255 days.

(21) Appl. No.: 16/635,052

(22) PCT Filed: Aug. 10, 2018

(86) PCT No.: PCT/SG2018/050406
§ 371 (c)(1),
(2) Date: Jan. 29, 2020

(87) PCT Pub. No.: WO2019/032053
PCT Pub. Date: Feb. 14, 2019

(65) Prior Publication Data
US 2020/0252004 A1    Aug. 6, 2020

(30) Foreign Application Priority Data
Aug. 11, 2017    (SG) .......................... 10201706597Y (51) Int. Cl.
*H02M 1/42*    (2007.01)
*H05B 45/10*    (2020.01)
(Continued)

(52) U.S. Cl.
CPC ....... *H02M 1/4208* (2013.01); *H02M 1/0025* (2021.05); *H05B 45/10* (2020.01); *H05B 45/14* (2020.01)

(58) Field of Classification Search
CPC .... H02M 1/4208; H02M 7/68; H02M 1/0012; H02M 1/0025; H05B 45/10;
(Continued)

(56) References Cited

U.S. PATENT DOCUMENTS

| | | | |
|---|---|---|---|
| 7,433,211 B1 | 10/2008 | Collmeyer et al. | |
| 7,719,248 B1 | 5/2010 | Melanson | |
| 2007/0067069 A1 | 3/2007 | Markowski | |
| 2012/0319604 A1* | 12/2012 | Walters | H02M 3/1582 315/200 R |

(Continued)

FOREIGN PATENT DOCUMENTS

| | | |
|---|---|---|
| CN | 105490544 A | 4/2016 |
| CN | 106849730 A | 6/2017 |

(Continued)

OTHER PUBLICATIONS

Wanfeng Zhang, Guang Feng, Yan-Fei Liu and Bin Wu, "A digital power factor correction (PFC) control strategy optimized for DSP," in IEEE Transactions on Power Electronics, vol. 19, No. 6, pp. 1474-1485, Nov. 2004, (Year: 2004).*
Written Opinion, International Search Report of International Search Authority, and IPRP for International Application No. PCT/SG2018/050406.
(Continued)

*Primary Examiner* — Peter M Novak
(74) *Attorney, Agent, or Firm* — JCIP; Joseph G. Chu; Jeremy I. Maynard (57) ABSTRACT

A device and a method for providing an electrical current to an electrical load is disclosed. In particular, the device comprises a memory storage device for storing a plurality of
(Continued)

ideal voltage waveforms; an electronic controller arranged in data communication with the memory storage device, the electronic controller operable to select one of the plurality of ideal voltage waveforms to compute a reference voltage and a switching period based on a predetermined rule; and an electronic switch arranged to receive the switching period to switch the electronic switch between an on state and an off state, wherein the electrical current is calculated based on a function of the reference voltage and the switching period of the electronic switch.

18 Claims, 7 Drawing Sheets (51) Int. Cl.
*H02M 1/00* (2006.01)
*H05B 45/14* (2020.01)

(58) Field of Classification Search
CPC ............ H05B 45/3725; H05B 45/38; H05B 45/382; H05B 45/385; H05B 45/14; Y02B 70/10
See application file for complete search history.

(56) References Cited

U.S. PATENT DOCUMENTS

2013/0106304 A1 5/2013 Wee et al.
2016/0338159 A1 11/2016 Wee et al.

FOREIGN PATENT DOCUMENTS

| WO | 9804031 A1 | 1/1998 | |
|----|-----------|--------|---|
| WO | 2010036974 A2 | 4/2010 | |
| WO | WO-2010036974 A2 * | 4/2010 | ........ H02M 7/53873 |

OTHER PUBLICATIONS

Feng G et al: "A Digital Power Factor Correction (PFC) Control Strategy Optimized for DSP", IEEE Transactions on Power Electronics, Institute of Electrical and Electronics Engineers, USA, vol. 19, No. 6, Nov. 1, 2004 (Nov. 1, 2004), pp. 1474-1485, XP0111121659, ISSN: 0885-8993, DOI: 10.1109/TPEL.2004.836675 *the whole document* In particular Figure 7 and p. 1478, left hand column, last paragraph.
Extended European Search Report dated Feb. 21, 2022 for European Application No. 18842957.5.
European Office Action dated Apr. 21, 2022 for European Application No. 18842957.5.

* cited by examiner

Look up table (LUT)

| Period/Frequency | Amplitude | Type |
|---|---|---|
| 60 Hz | 220V | AC Sine |
| 50 Hz | 240V | AC Sine |
| -- | 240V | DC |
| -- | 220V | DC |
| 50Hz | 120V | AC |
| 50 Hz | 100V | AC |
| 50 Hz | 230V | AC |

| DCM BUCK BOOST | | | | | | | | | |
|---|---|---|---|---|---|---|---|---|---|
| Transformer-390uH, Rfb-10 Ohm, 28 LED, 350mA | | | | | | | | | |
| Input Voltage | 90Vac | 110Vac | 120Vac | 132Vac | | 198Vac | 220Vac | 240Vac | 265Vac |
| Input Current | 0.340 | 0.280 | 0.260 | 0.240 | | 0.160 | 0.150 | 0.140 | 0.130 |
| Input power | 31.00 | 31.40 | 31.40 | 31.20 | | 32.30 | 33.10 | 33.40 | 34.00 |
| Power Factor | 0.985 | 0.984 | 0.982 | 0.985 | | 0.992 | 0.996 | 0.986 | 0.975 |
| Output voltage | 85.45 | 85.55 | 85.60 | 85.65 | | 86.00 | 86.28 | 86.29 | 86.33 |
| Output Current | 0.320 | 0.326 | 0.327 | 0.328 | | 0.344 | 0.353 | 0.357 | 0.361 |
| Output Power | 27.4 | 27.8 | 28.0 | 28.1 | | 29.6 | 30.5 | 30.8 | 31.2 |
| Efficiency | 88.29% | 88.68% | 89.14% | 90.04% | | 91.59% | 92.09% | 92.10% | 91.76% |
| Line Regulation | | | | | 11.64% | | | | |
| Switching Frequency | 45.7 | 53.76 | 56.82 | 60.61 | | 71.43 | 75.99 | 76.45 | 79.62 |
| Ton | 8.68 | 6.48 | 5.80 | 4.80 | | 3.20 | 2.60 | 2.40 | 2.14 |
| Toff | 13.2 | 12.2 | 12.10 | 11.50 | | 10.80 | 10.56 | 10.68 | 10.36 |
| VFB | 2.58 | 2.38 | 2.35 | 2.22 | | 2.08 | 2.01 | 2.01 | 1.95 |
| lower dimming | 27mA | 27mA | | | | | | 70mA | 70mA |

| DCM BUCK BOOST | | | | | | | | | |
|---|---|---|---|---|---|---|---|---|---|
| Transformer-390uH, Rfb-10 Ohm, 28 LED, 400mA | | | | | | | | | |
| Input Voltage | 90Vac | 110Vac | 120Vac | 132Vac | | 198Vac | 220Vac | 240Vac | 265Vac |
| Input Current | 0.400 | 0.330 | 0.310 | 0.280 | | 0.190 | 0.170 | 0.160 | 0.140 |
| Input power | 36.10 | 36.70 | 36.70 | 36.90 | | 37.40 | 37.90 | 38.20 | 38.80 |
| Power Factor | 0.985 | 0.988 | 0.985 | 0.986 | | 0.992 | 0.994 | 0.991 | 0.992 |
| Output voltage | 86.32 | 86.48 | 86.45 | 86.48 | | 86.70 | 86.79 | 86.85 | 86.93 |
| Output Current | 0.370 | 0.376 | 0.376 | 0.379 | | 0.393 | 0.398 | 0.403 | 0.409 |
| Output Power | 31.9 | 32.5 | 32.5 | 32.8 | | 34.1 | 34.5 | 35.0 | 35.5 |
| Efficiency | 88.38% | 88.51% | 88.57% | 88.82% | | 91.10% | 91.14% | 91.69% | 91.59% |
| Line Regulation | 9.85% | | | | | | | | |
| Switching Frequency | 40.65 | | | | | | | | 70.62 |
| Ton | | | | | | | | | |
| Toff | | | | | | | | | |
| VFB | 3.00 | | | | | | | | 2.23 |
| lower dimming | 27mA | 27mA | | | | | | 70mA | 70mA |

| DCM BUCK BOOST | | | | | | | | | |
|---|---|---|---|---|---|---|---|---|---|
| Transformer-390uH, Rfb-10 Ohm, 12 LED, 430mA | | | | | | | | | |
| Input Voltage | 90Vac | 110Vac | 120Vac | 132Vac | | 198Vac | 220Vac | 240Vac | 265Vac |
| Input Current | 0.190 | 0.150 | 0.140 | 0.130 | | 0.090 | 0.080 | 0.080 | 0.080 |
| Input power | 17.20 | 17.20 | 17.20 | 17.40 | | 18.60 | 19.10 | 19.60 | 20.10 |
| Power Factor | 0.988 | 0.996 | 0.995 | 0.994 | | 0.981 | 0.969 | 0.969 | 0.942 |
| Output voltage | 39.42 | 39.46 | 39.47 | 39.51 | | 39.68 | 39.75 | 39.79 | 39.85 |
| Output Current | 0.387 | 0.394 | 0.396 | 0.401 | | 0.420 | 0.427 | 0.433 | 0.440 |
| Output Power | 15.3 | 15.5 | 15.6 | 15.8 | | 16.7 | 17.0 | 17.2 | 17.5 |
| Efficiency | 88.70% | 90.39% | 90.87% | 90.94% | | 89.56% | 88.87% | 87.94% | 87.19% |
| Line Regulation | 12.37% | | | | | | | | |
| Switching Frequency | 31.35 | 34.01 | 34.97 | 36.63 | | 40.16 | 40.45 | 40.92 | 41.6 |
| Ton | 7.8 | 6.1 | 5.50 | 4.80 | | 3.10 | 2.80 | 2.56 | 2.28 |
| Toff | 24.1 | 23.3 | 23.00 | 22.50 | | 21.90 | 21.96 | 21.96 | 21.72 |
| VFB | 2.26 | 2.17 | 2.15 | 2.10 | | 2.04 | 2.03 | 1.98 | 1.99 |
| lower dimming | 27mA | 27mA | | | | | | 70mA | 70mA |

FIG. 5a

| CCM BUCK BOOST | | | | | | | | |
|---|---|---|---|---|---|---|---|---|
| Rfb-2 Ohm, 28 LED, 350mA | | | | | | | | |
| Input Voltage | 90Vac | 110Vac | 120Vac | 132Vac | | 198Vac | 220Vac | 240Vac | 265Vac |
| Input Current | 0.380 | 0.310 | 0.280 | 0.260 | | 0.170 | 0.160 | 0.140 | 0.130 |
| Input power | 34.20 | 34.70 | 34.50 | 34.50 | | 35.30 | 35.10 | 35.10 | 35.50 |
| Power Factor | 0.989 | 0.989 | 0.987 | 0.992 | | 0.992 | 0.995 | 0.994 | 0.980 |
| Output voltage | 86.92 | 86.80 | 86.90 | 86.93 | | 87.02 | 87.15 | 87.17 | 87.20 |
| Output Current | 0.342 | 0.340 | 0.344 | 0.346 | | 0.352 | 0.357 | 0.358 | 0.361 |
| Output Power | 29.7 | 29.5 | 29.9 | 30.1 | | 30.6 | 31.1 | 31.2 | 31.4 |
| Efficiency | 86.92% | 85.05% | 86.65% | 87.18% | | 86.77% | 88.64% | 88.91% | 88.55% |
| Line Regulation | | | | | 5.74% | | | | |
| Switching Frequency | 103.3 | 102.5 | 101.6 | 102.5 | | 100.8 | 91.91 | 95.42 | 88.03 |
| Ton | 4.48 | 3.76 | 3.48 | 3.20 | | 2.56 | 2.24 | 2.16 | 2.20 |
| Toff | 5.52 | 5.96 | 6.40 | 6.32 | | 7.36 | 8.44 | 8.32 | 9.00 |
| VFB | 2.85 | 2.61 | 2.56 | 2.45 | | 2.21 | 2.19 | 2.16 | 2.12 |
| lower dimming | 60.2mA | 73.3mA | 76.2mA | 79.6mA | | 82.7mA | 82.8mA | 82.8mA | 82.6mA |

| CCM BUCK BOOST | | | | | | | | |
|---|---|---|---|---|---|---|---|---|
| Rfb-2 Ohm, 12 LED, 370mA | | | | | | | | |
| Input Voltage | 90Vac | 110Vac | 120Vac | 132Vac | | 198Vac | 220Vac | 240Vac | 265Vac |
| Input Current | 0.179 | 0.147 | 0.135 | 0.123 | | 0.085 | 0.076 | 0.070 | 0.065 |
| Input power | 16.10 | 16.20 | 16.20 | 16.30 | | 16.90 | 16.90 | 17.00 | 17.10 |
| Power Factor | 0.996 | 0.996 | 0.996 | 0.995 | | 0.996 | 0.994 | 0.992 | 0.988 |
| Output voltage | 39.10 | 39.09 | 39.14 | 39.15 | | 39.19 | 39.22 | 39.25 | 39.24 |
| Output Current | 0.361 | 0.362 | 0.365 | 0.366 | | 0.372 | 0.374 | 0.375 | 0.376 |
| Output Power | 14.1 | 14.1 | 14.3 | 14.3 | | 14.6 | 14.7 | 14.7 | 14.8 |
| Efficiency | 87.67% | 87.23% | 88.07% | 87.91% | | 86.26% | 86.79% | 86.58% | 86.28% |
| Line Regulation | | | | | 4.01% | | | | |
| Switching Frequency | 61.27 | 59.1 | 59.67 | 56.82 | | 51.65 | 51.12 | 48.08 | 46.21 |
| Ton | 4.16 | 3.8 | 3.48 | 3.12 | | 2.44 | 2.36 | 2.28 | 2.00 |
| Toff | 12.24 | 13.2 | 13.36 | 14.44 | | 16.84 | 17.20 | 18.60 | 19.72 |
| VFB | 2.16 | 2.06 | 2.07 | 2.04 | | 1.96 | 1.92 | 1.92 | 1.92 |
| lower dimming | 94.6mA | 98mA | 97.6mA | 92.6mA | | 102.1mA | 102.1mA | 102.1mA | 102.1mA |

FIG. 5b

DEVICE AND METHOD FOR PROVIDING AN ELECTRICAL CURRENT TO AN ELECTRICAL LOAD VIA A PLURALITY OF IDEAL VOLTAGE WAVEFORMS

FIELD OF THE INVENTION

The present invention relates to a device and method for providing an electrical current to an electrical load. In particular, the present invention relates to a device and method for driving electrical loads using switched mode power supply (SMPS) configuration.

BACKGROUND ART

The following discussion of the background to the invention is intended to facilitate an understanding of the present invention only. It should be appreciated that the discussion is not an acknowledgment or admission that any of the material referred to was published, known or part of the common general knowledge of the person skilled in the art in any jurisdiction as at the priority date of the invention.

Existing switched mode power supply (SMPS) devices typically comprise numerous elements such as capacitors, inductors, and regulators. Such elements take up space and introduce possible distortions to electrical components and circuitries.

Devices or systems, also known as drivers, for driving electrical loads typically comprise digital or analog voltage or current controllers arranged in configurations not limited to, isolated or non-isolated configurations. Such controllers typically operate to take in electrical input such as alternating current and voltage to provide a regulated output. Most advanced controllers comprise some form of feedback mechanism/loop to ensure that at least one electrical parameter, such as electrical current, is maintained at a desirable or allowable range while achieving an acceptable level of power factor. However, in order to improve overall performance, conventional controllers typically incorporate electrical/electronic components such as resistors, capacitors, inductors etc. to compensate for distortion, reduce harmonics or improve power factor. Such components increase the overall cost and also increase form factor.

Further, the feedback of most existing controllers require the sensing of a variety of electrical parameters at every predetermined interval(s). Such sensing may increase the amount of time required to process the electrical input in order to produce the regulated output.

Some electrical loads such as LED units or LED lamp units are typically sensitive to fluctuations in current and temperature. As such, electrical controllers for LEDs need to take into account temperature and current requirements. The issue of noise generated by electronics and electrical components is an important consideration for sensitive electrical loads.

The present invention seeks to provide a system and method that alleviates the above-mentioned drawbacks or meet the above needs at least in part.

SUMMARY OF THE INVENTION

Throughout the document, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

The invention seeks to reduce the number of electronic components and improve power factor by utilizing a memory device for storing one or more ideal voltage waveforms. An input voltage Vi from an electrical source is used as a synchronized reference and the ideal waveform is used to compute a reference voltage for electrical current control.

In accordance with an aspect of the invention there is a device for providing an electrical current to an electrical load comprising a memory storage device for storing a plurality of ideal voltage waveforms; an electronic controller arranged in data communication with the memory storage device, the electronic controller operable to select one of the plurality of ideal voltage waveforms to compute a reference voltage and a switching period based on a predetermined criterion; and an electronic switch arranged to receive the switching period as input to switch the electronic switch between an on state and an off state, wherein the electrical current is calculated based on a function of the reference voltage and the switching period or frequency of the electronic switch.

In some embodiments, the at least one of the plurality of ideal voltage waveforms is an ideal alternating current (AC) waveform.

In other embodiments, the at least one of the plurality of ideal voltage waveforms is an ideal direct current (DC) waveform.

In some embodiments, the device further comprises a sense circuit arranged in data communication with the electronic controller, the sense circuit operable to sense a source input voltage, wherein the source input voltage provides electrical power to the device.

In some embodiments, the sense circuit comprises a potentiometer, a potential divider or a feedback resistor.

In some embodiments, the sensed source input voltage is divided by a predetermined number. The predetermined number may be an even number, such as four (4).

In some embodiments, in a transient state before the one of the plurality of ideal voltage waveforms is selected, the electronic controller is operable to use the source input voltage divided by the predetermined number as the reference voltage for switching the electronic switch.

In some embodiments, upon switching the electronic switch, a time Tx is measured from the time where the reference voltage is sensed at a predetermined voltage to the time where the reference voltage is next sensed at the predetermined voltage.

In some embodiments, the one of the plurality of ideal voltage waveforms is selected to compute the reference voltage when the following conditions are satisfied: i. after a multiple of the time period $T_X$; and ii. where the input voltage drops to zero; and wherein the period of the selected ideal voltage waveform corresponds to the time period $T_X$ or approximate the time period $T_X$.

In some embodiments, the ideal AC waveform comprises one or more of the following: a sine waveform, a square of a sine waveform, or a polynomial function waveform such as, but not limited to a quadratic function.

In some embodiments, if the device is deployed in a boost converter configuration, the sine waveform is selected.

In some embodiments, if the device is deployed in a flyback converter configuration, a square of a sine waveform or a polynomial function waveform is selected.

In some embodiments, if the input voltage does not drop to zero after the multiple of the time period $T_x$, an ideal DC waveform is selected.

In some embodiments, the device further comprises an analog to digital converter to convert the source input voltage to a digital waveform.

In some embodiments, the device is implemented at a primary side of a flyback switch mode power converter.

In some embodiments, the device further comprises a dimming circuit arranged to provide a dimming signal to the electrical load.

In some embodiments, the electronic controller comprises an application-specific integrated circuit (ASIC) or a field-programmable gate array (FPGA).

In some embodiments, the electronic switch is a MOSFET.

In some embodiments, the current is calculated based on the following mathematical expression:

$$I_{OUT} = \frac{V_i T_{ON} T_{OFF}}{2LT}$$

wherein $I_{out}$ is the current provided to the electrical load; T corresponds to a switching cycle; $T_{ON}$ is the switch on time of the electronic switch; $T_{OFF}$ is the switch off time of the electronic switch corresponding to a time taken for an inductor having an inductance L to discharge; and $V_i$ corresponds to the source input voltage.

In some embodiments, the input voltage $V_i$ is related to the reference voltage $V_h$ in accordance with the following mathematical expression:

$$V_h = \frac{V_i T_{ON} R_{fb}}{L}$$

Wherein $V_h$ is a reference voltage applied to a comparator for comparison with the source input voltage $V_i$, and where $R_{fb}$ is the resistance value of a feedback element, the feedback element positioned for comparing $V_h$ with $V_{fb}$ which is the voltage across the feedback element having resistance value $R_{fb}$.

In some embodiments, the current is calculated based on the following mathematical expression:

$$I_{OUT} = \frac{V_h T_{OFF}}{2 R_{fb} T}$$

In some embodiments, the current is calculated based on the following mathematical expression:

$$I_{OUT} = \frac{V_i V_h T_1 T_{OFF}}{2 R_{fb} V_1 T}$$

wherein $I_{OUT}$ is the current provided to the electrical load; T corresponds to a switching cycle $T = T_{ON} + T_{OFF} + T_{CALC}$; $T_{OFF}$ is the switch off time of the electronic switch corresponding to a time taken for an inductor having an inductance L to discharge; $V_i$ corresponds to the input voltage; $V_h$ a reference voltage that triggers the switch off of the electronic switch; $T_1$ corresponds to a time that the sensed input voltage reaches or is at a predetermined voltage $V_1$. In some embodiments, the memory storage device is a ROM, RAM, database, or LUT.

According to another aspect of the invention there is a method for providing a electrical current to an electrical load comprising the steps of: storing a plurality of ideal voltage waveforms in a memory storage device; selecting one of the plurality of ideal voltage waveforms and computing a reference voltage and a switching period based on a predetermined rule, the selecting and computing steps performed by an electronic controller; and receiving at an electronic switch, the switching period as input to switch the electronic switch between an on state and an off state, wherein the electrical current is calculated based on a function of the reference voltage and a switching period or frequency of the electronic switch.

In some embodiments, at least one of the plurality of ideal voltage waveforms is an ideal alternating current (AC) waveform.

In some embodiments, at least one of the plurality of ideal voltage waveforms is an ideal direct current (DC) voltage waveform.

In some embodiments, the method further comprises the step of sensing by a sense circuit a source input voltage, wherein the source input voltage provides electrical power to the device.

In some embodiments, the sense circuit comprises a potentiometer, a potential divider or a feedback resistor.

In some embodiments, the method further comprises the step of dividing the sensed source input voltage by a predetermined number. In some embodiments, the predetermined number is 4. In other embodiments, the predetermined number is any even integer. In some embodiments, the predetermined number is any odd integer.

In some embodiments, the method further comprises the step of activating the electronic switch using the divided sensed input voltage as reference voltage.

In some embodiments, the method further comprises the step of measuring a time $T_1$ corresponding the time where the input voltage is sensed at a predetermined voltage to the time where the input voltage is next sensed at the predetermined voltage. The predetermined criterion may include situations where the following conditions are satisfied: i. after a multiple of a time period $T_1$; and ii. where the input voltage drops to zero; and wherein the period of the selected ideal voltage waveform corresponds to the time period $T_1$ or approximate the time period $T_1$.

In some embodiments, the ideal AC waveform comprises one or more of the following: a sine waveform, a square of a sine waveform, a quadratic function waveform, a polynomial function waveform.

In some embodiments, if the device is deployed in a boost converter configuration, the sine waveform is selected.

In some embodiments, if the device is deployed in a flyback converter configuration, a square of a sine waveform is selected.

In some embodiments, if the input voltage does not drop to zero after the multiple of the time period $T_1$, a DC waveform is selected.

In some embodiments, the method further comprises the step of converting the (source) input voltage to digital value.

In some embodiments, the device is implemented at a primary side of a flyback switch mode power converter.

In some embodiments, the method further comprises the step of providing a dimming signal to the electrical load.

In some embodiments, the electronic controller comprises an application-specific integrated circuit (ASIC) or a field-programmable gate array (FPGA).

In some embodiments, the electronic switch is a metal-oxide semiconductor field-effect transistor (MOSFET).

In some embodiments, the current is calculated based on the following mathematical expression $$I_{OUT} = \frac{V_i T_{ON} T_{OFF}}{2LT}$$

wherein $I_{OUT}$ is the electrical current provided to the electrical load; T corresponds to a switching cycle; $T_{ON}$ is the switch on time of the electronic switch; $T_{OFF}$ is the switch off time of the electronic switch corresponding to a time taken for an inductor having an inductance L to discharge; and $V_i$ corresponds to the input voltage.

In some embodiments, the input voltage $V_i$ is related to the reference voltage $V_h$ in accordance with the following mathematical expression:

$$V_h = \frac{V_i T_{ON} R_{fb}}{L}$$

wherein $R_{fb}$ is the resistance value of a feedback element, the feedback element positioned for comparing $V_h$ with a voltage $V_{fb}$ across the feedback element having resistance $R_{fb}$.

In some embodiments, the current is calculated based on the following mathematical expression:

$$I_{OUT} = \frac{V_h T_{OFF}}{2TR_{fb}}$$

In some embodiments, the current is calculated based on the following mathematical expression $$I_{OUT} = \frac{V_i V_h T_1 T_{OFF}}{2R_{fb} V_1 T}$$

wherein $I_{OUT}$ is the current provided to the electrical load; T corresponds to a switching cycle; $T_{OFF}$ is the switch off time of the electronic switch corresponding to a time taken for an inductor having an inductance L to discharge; $V_i$ corresponds to the input voltage; $V_h$ a reference voltage that triggers the switch off of the electronic switch; $T_1$ corresponds to a time that the sensed input voltage reaches a predetermined voltage $V_1$.

BRIEF DESCRIPTION OF THE DRAWINGS

The present invention will now be described, by way of example only, with reference to the accompanying drawings, in which:

FIG. 5a and FIG. 5b are table of results demonstrating the effectiveness of the device and method in discontinuous mode and continuous mode in a buck boost switched mode power supply (SMPS) configuration.

Other arrangements of the invention are possible and, consequently, the accompanying drawing is not to be understood as superseding the generality of the preceding description of the invention.

PREFERRED EMBODIMENTS OF THE INVENTION

Particular embodiments of the present invention will now be described with reference to the accompanying drawings. The terminology used herein is for the purpose of describing particular embodiments only and is not intended to limit the scope of the present invention. Additionally, unless defined otherwise, all technical and scientific terms used herein have the same meanings as commonly understood by one of ordinary skill in the art to which this invention belongs.

Throughout the description, the term 'waveform' is not limited to actual waveform but include data and/or dataset associated with an electrical signal, such as a voltage or current supply signal. In particular, one waveform may include one or more sets of data associated with the waveform.

The device is suited, but not limited to provide at least a relatively 'ripple free' current defined to be less than 5% from the specified rated current. The specified rated current is typically (but not limited to) around 350 mA to 700 mA. Throughout the description, references to 'current', 'connection(s)' refer to electrical current and connections unless otherwise stated.

Throughout the description, the input voltage $V_i$ refers to a source input voltage obtained from an electrical power mains or source; the reference voltage $V_h$ refers to a voltage computed from an ideal voltage waveform.

In accordance with an aspect of the invention there comprises a device for providing an electrical current to an electrical load comprising a memory storage device for storing a plurality of ideal voltage waveforms; an electronic controller arranged in data communication with the memory storage device, the electronic controller operable to select one of the plurality of ideal voltage waveforms to compute a reference voltage based on a predetermined criterion; and an electronic switch arranged to receive the reference voltage as input to switch the electronic switch between an on state and an off state, wherein the electrical current is calculated based on a function of the reference voltage and a switching period or frequency of the electronic switch.

Figure 1A:
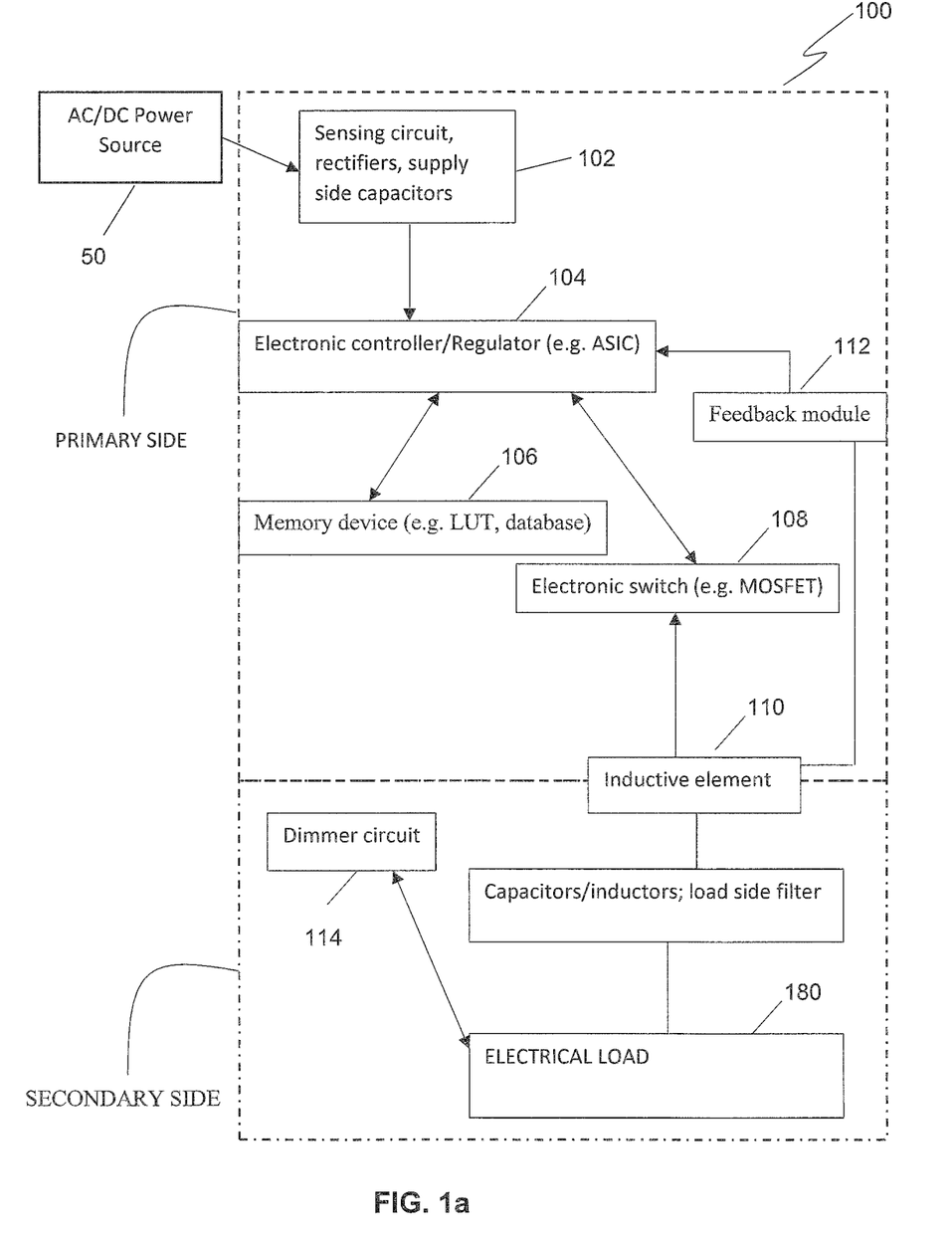
FIG. 1a illustrates a device for providing electrical current to an electrical load according to some embodiments of the invention.

Referring to the embodiment illustrated in FIG. 1a, the device 100 is a switch mode power supply (SMPS) or driver for providing electrical current to one or more electrical loads 180. The device 100 draws electrical energy from an electrical supply 50, such as an alternating current (AC) power source or a direct current (DC) power source. Examples of the power supply include the mains of a building providing AC power or a battery pack providing DC power. The device 100 comprises a rectifier module 102 arranged in electrical connection with an electronic controller 104, the electronic controller 104 arranged or configured to receive one or more inputs associated with the ideal voltage waveform from a memory device 106 to drive an electronic switch 108. The switching of the electronic switch 108 regulate the provision of current to the electrical load 180. The electronic switch 108 is arranged in electrical connection with an inductive element 110, which may be an isolating transformer where the device 100 is arranged in a flyback configuration or an inductor where the device 100 is arranged in a DC to DC non-isolated configuration. The discharge time of the inductive element 110 or isolating transformer is used as one of the inputs to control the switching state of the electronic switch 108. In some embodiments, the voltage across the inductive element 110 may be sensed by a feedback module 112, after which a switch off time $T_{OFF}$ is computed by the electronic controller 104 based on the discharge time of the inductive element 110.

In some embodiments there comprise a dimmer circuit 114. Where the electrical load comprises LED lamp units, the dimmer circuit 114 may be arranged at the secondary side of the device 100 to adjust the brightness of the LED lamp units. The dimmer circuit 114 may be arranged to control the current provided to the electrical load 180 and may receive inputs from motion sensors, potentiometer et cetera as known to a skilled person. It is to be appreciated that logic associated with the dimmer circuit 114 can be implemented as an output voltage of the electronic controller 104 digitalized by an analog to digital converter (ADC).

In some embodiments, the rectifier module 102 comprises a rectifier bridge element, current or voltage sensing circuits, and supply side capacitors or resistors. In some embodiments, the feedback module 112 comprise one or more comparators for comparing a reference voltage $V_h$ with the voltage $V_{fb}$ across a feedback element, such as a feedback resistor having resistance $R_{fb}$. In some embodiments, the electronic controller 104 may be an application-specific integrated circuit (ASIC), a field-programmable gate array (FPGA) or other type of programmable or non-programmable integrated circuit (IC), where in the case the electronic controller 104 is non-programmable the logic may be hard-wired onto one or more circuit board(s). The electronic controller 104 may be arranged to receive a plurality of inputs including, but not limited to:

i. A switching period T and corresponding $T_{ON}$ (switch on) and $T_{OFF}$ (switch off) measurements;
ii. An input voltage or source input voltage $V_i$ digitized from the main voltage or power source;
iii. Inductance (L) of the inductive element 110, which may be predetermined.

Based on the inputs, the electrical current to be provided to the load is calculated based on the following mathematical expression in equation (1):

$$I_{OUT} = \frac{V_i T_{ON} T_{OFF}}{2LT} \quad (1)$$

wherein $I_{OUT}$ is the electrical current to be provided to the electrical load; T corresponds to the switching period (or switching cycle); $T_{ON}$ is the switch on time of the electronic switch; $T_{OFF}$ is the switch off time of the electronic switch corresponding to a time taken for the inductive element 110 having an inductance L to discharge; and $V_i$ corresponds to the input voltage.

In some embodiments, the switching period T is a summation of the following parameters: $T_{ON}+T_{OFF}+T_{CALC}$, wherein $T_{CALC}$ is the time after the discharge time of the inductive element to compute equation (1).

In some embodiments, the input voltage $V_i$ is related to a reference voltage $V_h$ in accordance with the following mathematical expression in equation (2):

$$V_h = \frac{V_i T_{ON} R_{fb}}{L} \quad (2)$$

Wherein $V_h$ is the reference voltage applied to the comparator within the feedback module 112 for comparison with the voltage across feedback element having resistance $R_{fb}$.

In some embodiments, the output electrical current is calculated based on the following mathematical expression utilizing the switch off time $T_{OFF}$, the reference voltage $V_h$ and the switching period T mathematically expressed as equation (3) as follows:

$$I_{OUT} = \frac{V_h T_{OFF}}{2T R_{fb}} \quad (3)$$

In some embodiments, the output electrical current is calculated based on the following mathematical expression:

$$I_{OUT} = \frac{V_i V_h T_1 T_{OFF}}{2 R_{fb} V_1 T} \quad (4)$$

By utilizing equation (4) instead of equation (3), any delay associated with the use of a comparator may be avoided, because in equation (4) the contribution of uncertainty coming from the comparator are canceled by introduction of the parameters $V_i$, $T_1$ and $V_1$.

Where $T_1$ corresponds to a time that the input voltage $V_i$ based on the sensing circuit 102 reaches a predetermined voltage $V_1$ from 0.

The memory device 106 may comprise a random access memory (RAM), a read-only memory (ROM), and/or other memory device capable of storing data associated with the plurality of ideal voltage waveforms. In some embodiments, the memory device 106 may be integrated as part of the electronic controller 104. In some embodiments, the electronic controller 104 and/or the memory device 106 forms part of an integrated circuit (IC) chip. In other embodiments, the memory device 106 may be a separate IC chip from the electronic controller 104. In some embodiments, the memory device 106 may be implemented as look-up table, which define specific ideal voltage waveforms to be selected based on a set of operation conditions as inputs. Such inputs may be associated with the initial operating parameters of the device 100 before an ideal voltage waveform is selected to compute the reference voltage $V_h$.

It is to be appreciated that the SMPS may be arranged in an isolated fly back configuration or a non-isolated configuration (DC power supply).

The ideal waveforms stored in memory device 106 may be digitized ideal waveforms, each waveform defined by at least three parameters including period or frequency; amplitude; and type.

Figure 1B:
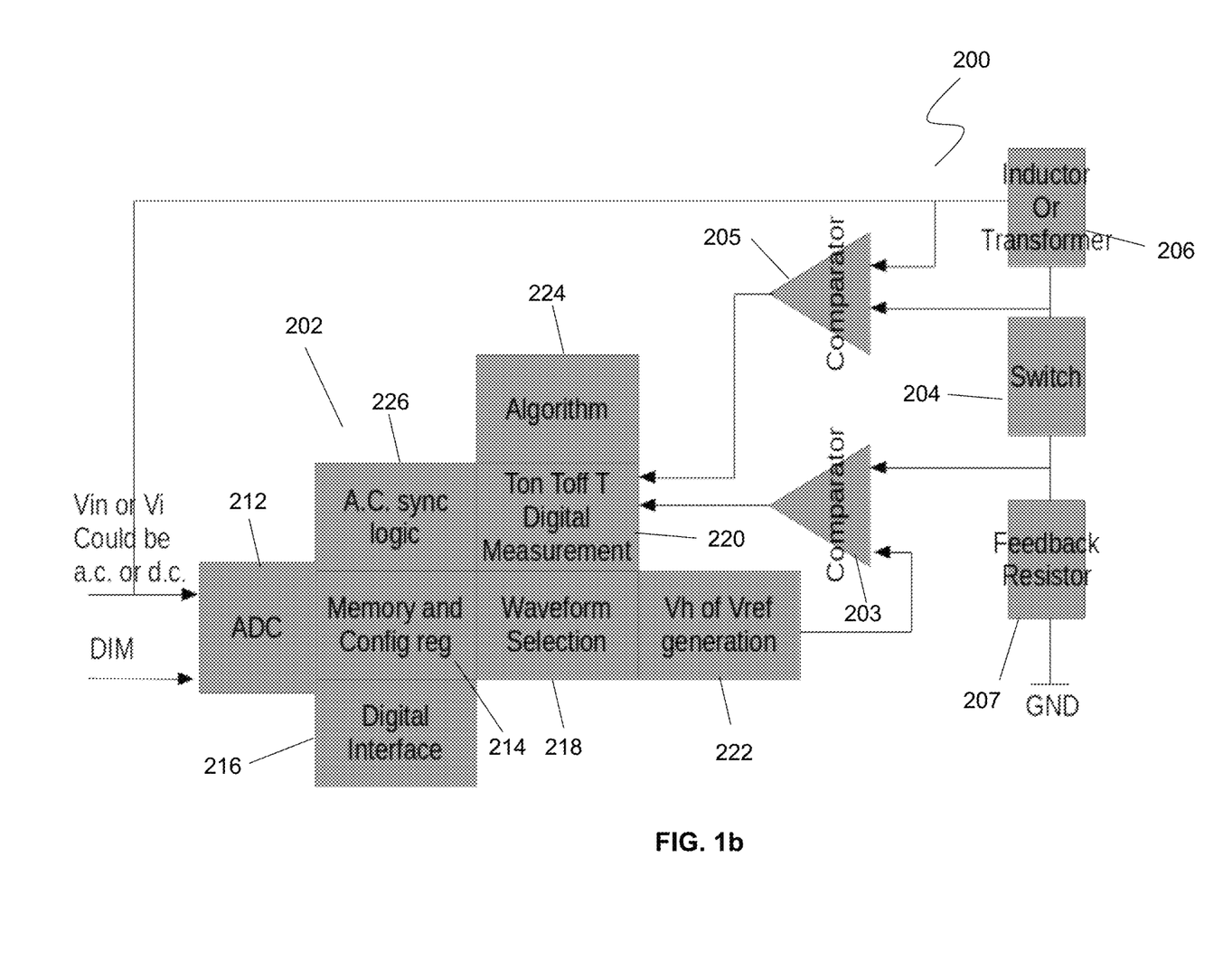
FIG. 1b illustrates another embodiment of the device for providing electrical current to an electrical load.

FIG. 1b shows another embodiment of a device 200 for providing an electrical current $I_{OUT}$ to drive an electrical load comprising an electronic controller 202 arranged to receive a plurality of inputs to compute the reference voltage $V_h$, and an electronic signal to turn on and off an electronic switch 204 to produce the necessary $I_{OUT}$. In some embodiments, the electronic switch 204 is a MOSFET.

The plurality of inputs include, but is not limited to:

i. A switching period T (generated by an internal clock) and corresponding $T_{ON}$ and $T_{OFF}$ measurements;

ii. An input voltage $V_i$ digitized from the main voltage or power source;

iii. Inductance (L) of an inductive element 206, which may be predetermined.

Based on the inputs, the electrical current $I_{OUT}$ to be provided to the load is calculated based on equation (1).

In the embodiment shown in FIG. 1b, the electronic controller 202 may comprise an analog to digital convertor ADC 212, a memory unit 214, a digital interface 216, a waveform selector 218, a digital measurement unit 220, a reference voltage generator 222, an internal algorithm unit 224, and a synchronization unit 226.

The ADC 212 arranged to receive electrical energy having a voltage $V_i$ from a main AC or from a DC source. The $V_i$ together with any current preset signal DIM is digitalized by the ADC. If a high voltage is detected (e.g. above 280 V) the value will be divided by a resistor divider. The digitalization is used to: 1) synchronize the ideal voltage waveform to the input voltage $V_i$; 2) compute $V_{OUT}$ value using the mathematical expression $$V_{OUT}=V_i*T_{ON}/T_{OFF} \quad (5)$$

The memory unit 214 comprises storage of ideal voltage waveforms that could be sine, triangular, polynomial or others. These could be embedded during fabrication process, or could be loaded from any external device (not shown).

The memory unit 214 may comprise a configuration register for allowing a user/programmer to preset different modes of operation. For example, the DIM value may be adjusted digitally, the waveform shape may be selected, and operation parameters such as internal error condition and measured value may be checked and/or obtained.

The digital interface 216 provides one or more user interface allowing the loading of ideal voltage waveform(s) from an external device and to configure and check modes and measured values.

This waveform selector 218 facilitates the selection of suitable ideal waveform based on the input voltage $V_i$. This selection could be done using digital interface 216 or could be done automatically by the synchronization unit 226. The digital measurement unit 220 is arranged to measure the time parameters T, $T_{ON}$ and $T_{OFF}$. It is electrically connected to a first comparator 203 to receive a output resultant of $V_h$ and $V_{fb}$ as inputs, where $Vf_b$ is the voltage across a feedback resistor 207 at one end of the feedback resistor 207 connected to the source of the electronic switch 204, the other end of the feedback resistor 207 is connected to ground. The feedback resistor 207 has a resistance value of $R_{fb}$.

The digital measurement unit 220 is also connected to a second comparator 205. The second comparator 205 is connected to check the discharge time of the inductive element 206. One of the input terminal of the second comparator 205 is arranged to tap the source input voltage $V_i$, another input terminal of the second comparator 205 is arranged to tap the voltage at the drain of the switch 204. This is used for measuring $T_{OFF}$.

The reference voltage generator 222 comprises a digital to analog convertor operable to convert the ideal voltage waveform to an analog waveform.

The internal algorithm unit 224 receives parameters from other units and produces calculations based on equations (1) to (5).

Figure 4A:
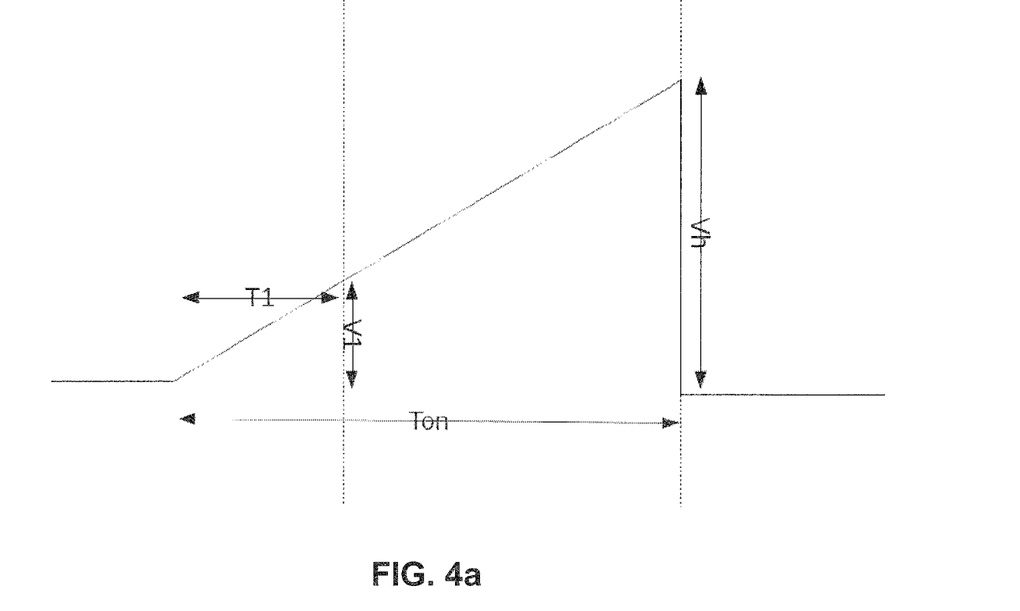
FIG. 4a shows part of a voltage waveform (y-axis) against time (x-axis) depicting the relationship between the reference voltage, a fraction of input voltage, and time in a transient state before an ideal voltage waveform is selected from the LUT.
Figure 4B:
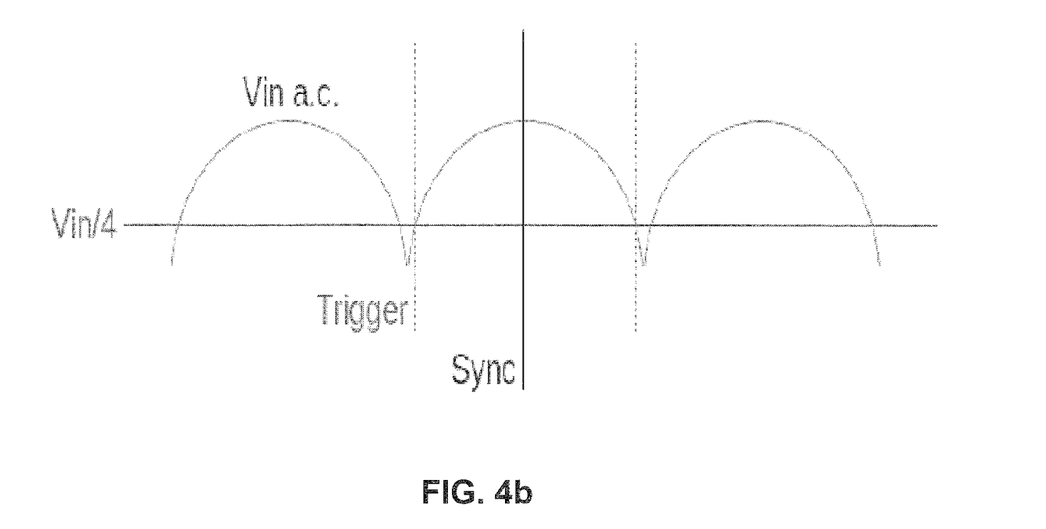
FIG. 4b illustrates the synchronization of an ideal waveform to the input voltage using a trigger.

The synchronization unit 226 is operable to synchronize the ideal voltage waveform stored in the memory unit 214 to the input AC waveform $V_i$. It uses a threshold level, for example $V_i/4$ to trigger the waveform as illustrated in FIG. 4b. A digital counter counts between two trigger points. The half of the counter will be the half of the waveform. The top of the ideal waveform will be synchronized with the top of the input $V_i$ signal.

Figure 2:
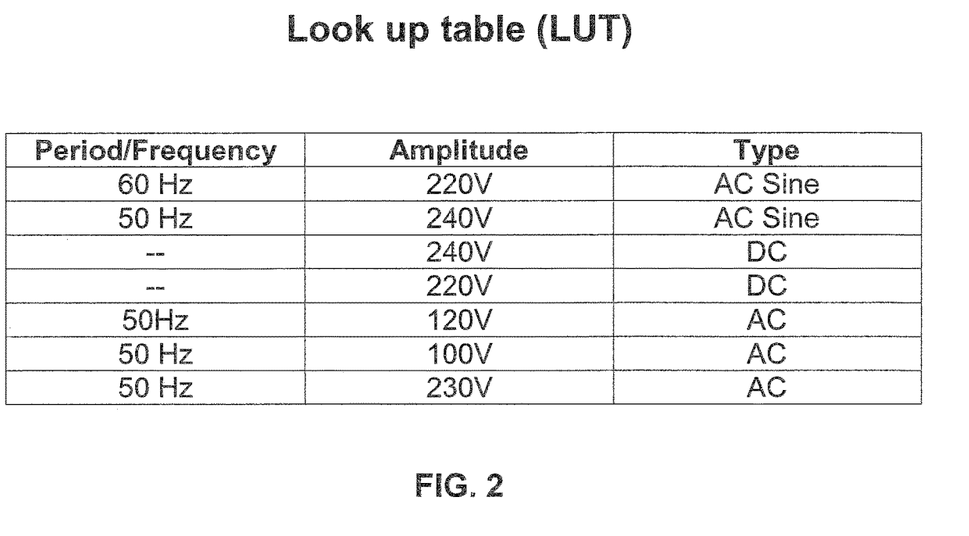
FIG. 2 is an example of a Look up table (LUT) for storage of ideal voltage waveforms according to some embodiments.

With reference to FIG. 2, an embodiment of the memory device 106, 214 may be in the form of a look-up table (LUT) comprising various entries, for example, a 60 Hz; 240 V; AC ideal sine waveform. Thus the at least one of the plurality of ideal voltage waveforms may be an ideal alternating current (AC) waveform or an ideal direct current (DC) waveform. The memory device 106 may be populated by ideal waveforms based on common supply AC voltages utilized around the world, such as, but not limited to, 100-120 VAC; 220-240 VAC etc. Once populated, the relevant ideal voltage waveform will be selected based on feedback obtained during the first few cycles of operating the device 100, hereinafter referred to as transient state. The term 'ideal waveform' may also refer to the data associated with the waveform, including digital data.

Figure 3:
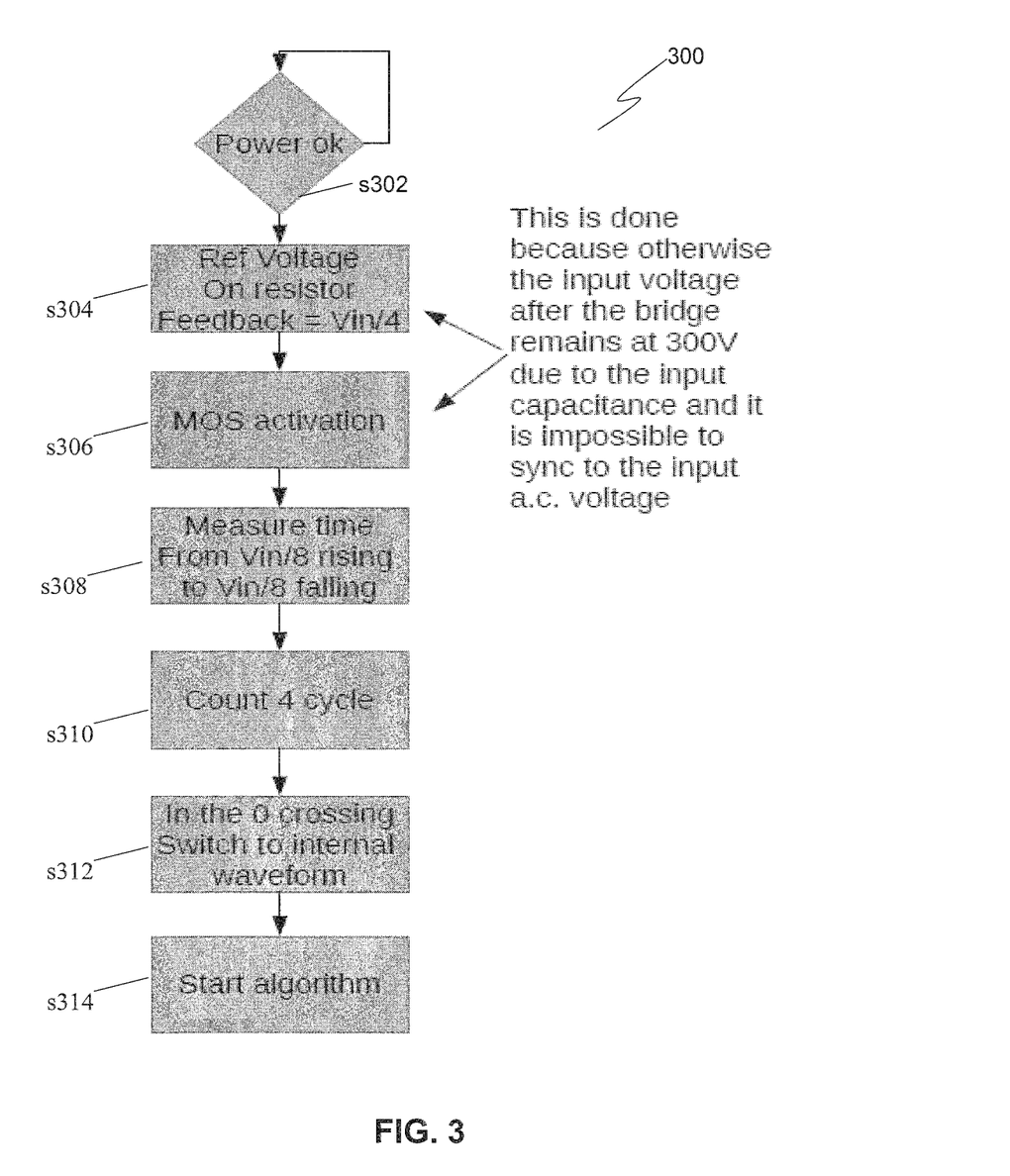
FIG. 3 is a flow chart illustrating a method for selecting an entry from the LUT of FIG. 2 as part of the process to provide electrical current to an electrical load.

The method 300 of selecting and synchronizing an applicable ideal waveform from the LUT in operation is detailed as follows. It is to be appreciated that before an ideal waveform is selected from the LUT or memory device 106, the device 100 operates in a transient state.

The process commence once the electricity mains (e.g. AC supply) is switched on (step s302) and electricity flows to device 100, 200. Electricity may pass through the rectifier module 102 and input voltage $V_i$ is sensed by a sense circuit which may be in the form of a sense resistor circuit. The sense circuit may comprise a potentiometer, a potential divider, a feedback resistor or a combination of any of the aforementioned elements having resistance $R_{fb}$.

The sensed input voltage $V_i$ is divided by a predetermined number according to the input voltage range of the ADC. In some embodiments, the predetermined number is 4 (step s304). It is to be appreciated that the predetermined number may be any integer and may preferably be an even integer.

Once determined, the $V_i/4$ is used as a trigger to synchronize the ideal voltage waveform with $V_i$.

The electronic switch is activated (step s306) and the time taken from the input voltage $V_i$ to rise from 0 to $V_1$ (see FIG. 4) and the voltage to fall from $V_i$ to $V_1$ is measured, preferably with the use of an internal oscillator or clock which may be integrated with the electronic controller 104. $V_1$ may be calculated or derived based on the division of input voltage $V_i$ by a predetermined number, such as 8 (step s308).

After the time $T_1$ between the zero crossing ($V_i=0$) to $V_1$ (rising) is obtained and time $T_2$ from $V_1$ (falling) to zero crossing ($V_i=0$) is obtained, a predetermined number of cycles (for example 4 cycles of $T_1$ and $T_2$) are counted (step s310). At the zero crossing after the four (4) cycles, the ideal waveform from the LUT is activated and the device now switches (step s312) to a steady-state using the selected ideal waveform as $V_h$. The steady-state control algorithm for providing the regulated current based on equations (1) to (4) is activated to control the electronic switch (step s314).

In the event where the voltage $V_i$ does not drop to zero after the multiple of cycles, a DC waveform is selected.

The selected ideal voltage waveform can be multiplied digitally by some constant to adjust the output current $I_{OUT}$. Then it is converted to analog by the reference voltage generator 222.

The selected ideal AC waveform may comprise one or more of the following: a sine waveform, a square of a sine waveform, a polynomial function waveform. The polynomial function waveform may be a quadratic function waveform.

In some embodiments, if the device 100 is deployed as a boost converter configuration, a sine waveform is selected. If the device 100 is deployed as a flyback converter configuration, a square of a sine waveform is selected.

In some embodiments, the electronic controller may comprise an application-specific integrated circuit (ASIC) or a field-programmable gate array (FPGA).

In some embodiments, where the electronic switch is a MOSFET, the gate of the MOSFET may be connected to the output of the electronic controller 104 to provide the necessary switch on time $T_{ON}$ to switch the electronic switch 108. The drain of the electronic switch 108 may be connected to the inductive element 110, and the source of the electronic switch 108 may be connected to electrical ground via feedback resistor.

FIG. 5*a* and FIG. 5*b* illustrate the device 100 used in buck boost, isolated configurations, operating in discontinuous conduction mode (DCM) shown in FIG. 5*a*, and continuous conduction mode (CCM) shown in FIG. 5*b*.

FIG. 5*a* illustrates the operating results of the device 100 having an isolating transformer having a inductance value of 390 µH, a sense feedback resistor $R_{fb}$ having resistance value of 10 ohms, an output current $I_{OUT}$ at 350 mA, 400 mA for 28 LED units forming a high powered LED lamp unit as electrical load and 430 mA as 12 LED units forming a high powered LED lamp unit as electrical load respectively. The input voltage $V_i$ is varied between 90 VAC and 265 VAC. It was observed that the power factor of the device 100 in operation varies from 0.942 to 0.996.

FIG. 5*b* illustrates the operating results of the device 100 having a sense feedback resistor $R_{fb}$ having resistance value of 10 ohms, an output current $I_{OUT}$ at 350 mA, for 28 LED as electrical load and 370 mA as 12 LED as electrical load respectively. The input voltage $V_i$ is varied between 90 VAC and 265 VAC. It was observed that the power factor of the device 100 in operation varies from 0.980 to 0.996.

It is appreciable that the device 100, or part thereof, may be implemented in a form of one or more integrated circuit chips (IC chips). In some embodiments, the whole device 100 may be an IC chip.

It is to be appreciated by the person skilled in the art that variations and combinations of features described above, not being alternatives or substitutes, may be combined to form yet further embodiments falling within the intended scope of the invention.

The invention claimed is:

1. A device for providing an electrical current from a power source to an electrical load comprising
    a memory storage device for storing a plurality of ideal voltage waveforms;
    an electronic controller arranged in data communication with the memory storage device, the electronic controller operable to select one of the plurality of ideal voltage waveforms based on an input voltage of the power source to compute a reference voltage and a switching period based on a predetermined rule; and
    an electronic switch arranged to receive the switching period to switch the electronic switch between an on state and an off state, wherein the electrical current is calculated based on a function of the reference voltage and the switching period of the electronic switch;
    a sense circuit arranged in electrical connection with the electronic controller, the sense circuit operable to sense the input voltage of the power source;
    wherein the sensed input voltage is divided by a predetermined number to obtain a threshold voltage that is used to determine a frequency of the input voltage used to select one of the plurality of ideal voltage waveforms, such that in a transient state before the one of the plurality of ideal voltage waveforms is selected, the electronic controller is operable to use the sensed source voltage divided by the predetermined number as the threshold voltage;
    wherein upon switching the electronic switch, a time $T_X$ is measured from the time where the input voltage is sensed at a predetermined voltage to the time where the input voltage is next sensed at the predetermined voltage, wherein the one of the plurality of ideal voltage waveforms is selected to compute the reference voltage when the following conditions are satisfied:
    i. after a multiple of the time $T_X$; and
    ii. where the input voltage drops to zero;
    and wherein the period of the selected ideal voltage waveform corresponds to the time $T_X$ or approximate the time period $T_X$, such that if the input voltage does not drop to zero after the multiple of the time period $T_X$, an ideal DC waveform is selected.

2. The device according to claim 1, wherein the sense circuit comprises at least one of the following: a potentiometer, a potential divider, a feedback resistor.

3. The device according to claim 1, wherein the predetermined number is 4.

4. The device according to claim 1, further comprises an analog to digital converter to convert the source voltage to a digital waveform.

5. The device according to claim 1, wherein the device is implemented at a primary side of a flyback switch mode power converter.

6. The device according to claim 1, further comprises a dimming circuit arranged in data communication with the electronic controller.

7. The device according to claim 1, wherein the electronic controller comprises an application-specific integrated circuit (ASIC) or a field-programmable gate array (FPGA).

8. The device according to claim 1, wherein the memory storage device is a ROM, RAM, database, LUT.

9. A device for providing an electrical current from a power source to an electrical load comprising
    a memory storage device for storing a plurality of ideal voltage waveforms; a
    n electronic controller arranged in data communication with the memory storage device, the electronic controller operable to select one of the plurality of ideal voltage waveforms based on an input voltage of the power source to compute a reference voltage and a switching period based on a predetermined rule; and
    an electronic switch arranged to receive the switching period to switch the electronic switch between an on state and an off state, wherein the current is calculated based on the following mathematical expression $$I_{out} = \frac{V_i T_{on} T_{off}}{2LT}$$

wherein $I_{OUT}$ is the current provided to the electrical load; T corresponds to a switching cycle; $T_{ON}$ is the switch on time of the electronic switch; $T_{OFF}$ is the switch off time of the electronic switch corresponding to a time taken for an inductor having an inductance L to discharge; and Vi corresponds to the source input voltage; and wherein the input voltage $V_i$ is related to the reference voltage $V_h$ in accordance with the following mathematical expression:

$$V_h = \frac{V_i T_{on} R_{fb}}{L}$$

wherein $R_fb$ is the resistance value of a feedback element, the feedback element positioned for comparing $V_h$ with $V_{fb}$, where $V_{fb}$ is the voltage across the feedback element having resistance value $R_{fb}$.

10. The device according to claim 9, wherein the current is calculated based on the following mathematical expression:

$$I_{out} = \frac{V_h T_{off}}{2TR_{fb}}.$$

11. A method for providing electrical current from a power source to an electrical load comprising
storing a plurality of ideal voltage waveforms in a memory storage device;
selecting one of the plurality of ideal voltage waveforms based on an input voltage of the power source to compute a reference voltage and a switching period based on a predetermined rule, the selecting step performed by an electronic controller;
receiving at an electronic switch, the switching period as input to switch the electronic switch between an on state and an off state, wherein the electrical current is calculated based on a function of the reference voltage and a switching period or frequency of the electronic switch;
sensing by a sense circuit the input voltage;
dividing the sensed input voltage by a predetermined number to obtain a threshold voltage that is used to determine a frequency of the input voltage, wherein the frequency of the input voltage is used to select one of the plurality of ideal voltage waveforms;
activating the electronic switch using the divided sensed input voltage as reference voltage;
measuring a time $T_X$ corresponding the time where the input voltage is sensed at a predetermined voltage to the time where the input voltage is next sensed at the predetermined voltage;
wherein the predetermined rule includes where the following conditions are satisfied:
i. after a multiple of a time $T_X$; and
ii. where the input voltage drops to zero;
and wherein the period of the selected ideal voltage waveform corresponds to the time $T_X$ or approximate the time $T_X$, such that if the input voltage does not drop to zero after the multiple of the time period $T_X$, an ideal DC waveform is selected.

12. The method according to claim 11, wherein at least one of the plurality of ideal voltage waveforms is one of the following: an ideal alternating current (AC) waveform, an ideal direct current (DC) voltage waveform.

13. The method according to claim 11, wherein the predetermined number is 4.

14. The method according to claim 11, further comprises the step of converting the source voltage to a digital waveform.

15. The method according to claim 11, wherein the device is implemented at a primary side of a flyback switch mode power converter.

16. The method according to claim 11, wherein the current is calculated based on the following mathematical expression $$I_{OUT} = \frac{V_i V_h T_1 T_{OFF}}{2R_{fb} V_1 T}$$

wherein $I_{OUT}$ is the current provided to the electrical load; T corresponds to a switching cycle; $T_{OFF}$ is the switch off time of the electronic switch corresponding to a time taken for an inductor having an inductance L to discharge; $V_i$ corresponds to the input voltage; $V_h$ a reference voltage that triggers the switch off of the electronic switch; $T_1$ corresponds to a time that the sensed input voltage reaches a predetermined voltage $V_1$.

17. A method for providing electrical current from a power source to an electrical load comprising
storing a plurality of ideal voltage waveforms in a memory storage device;
selecting one of the plurality of ideal voltage waveforms based on an input
voltage of the power source to compute a reference voltage and a switching period based on a predetermined rule, the selecting step performed by an electronic controller;
receiving at an electronic switch, the switching period as input to switch the electronic switch between an on state and an off state, wherein the electrical current is calculated based on a function of the reference voltage and a switching period or frequency of the electronic switch;
wherein the electrical current is calculated based on the following mathematical expression $$I_{out} = \frac{V_i T_{on} T_{off}}{2LT}$$

wherein $I_{OUT}$ is the electrical current provided to the electrical load; T corresponds to a switching cycle; $T_{ON}$ is the switch on time of the electronic switch; $T_{OFF}$ is the switch off time of the electronic switch corresponding to a time taken for an inductor having an inductance L to discharge; and $V_i$ corresponds to the input voltage, and
wherein the input voltage $V_i$ is related to the reference voltage $V_h$ in accordance with the following mathematical expression:

$$V_h = \frac{V_i T_{on} R_{fb}}{L}$$

wherein $R_{fb}$ is the resistance value of a feedback element, the feedback element positioned for comparing $V_h$ with $V_{fb}$, wherein $V_{fb}$ is the voltage across the feedback element having resistance value $R_{fb}$.

18. The device according to claim 9, wherein the current is calculated based on the following mathematical expression:

$$I_{out} = \frac{V_h T_{off}}{2TR_{fb}}.$$

* * * * *